INVENTOR.
EINAR T. YOUNG
BY George L. Church
ATTORNEY

CARD READER

Filed Dec. 27, 1962 3 Sheets-Sheet 2

INVENTOR.

EINAR T. YOUNG

BY George L. Church

ATTORNEY

INVENTOR.
EINAR T. YOUNG
BY George L. Church
ATTORNEY

United States Patent Office 3,294,957

Patented Dec. 27, 1966

3,294,957

CARD READER

Einar T. Young, Newtown Square, Pa., assignor to Sun Oil Company, Philadelphia, Pa., a corporation of New Jersey Filed Dec. 27, 1962, Ser. No. 247,657

2 Claims. (Cl. 235—61.11)

This invention relates to a card reader, and more particularly to a device adapted to receive a punched card and to take information therefrom. This information is used to control the operation of switches, to thereby set up electrical circuits selectively, in accordance with the information on the card.

By way of example, the card reader of the invention will be referred to in connection with a digital blending (proportioning) system of the type described in my copending application, Serial No. 180,211, filed March 16, 1962, which application ripened on September 13, 1966 into Patent No. 3,272,217. However, the invention is of wider application and may be used wherever it is desired to selectively operate switches in accordance with information contained on a punched card.

An object of this invention is to provide a novel card reader construction.

Another object is to provide a card reader so constructed that the parts most liable to become worn out can be quickly and easily replaced.

A further object is to provide a card reader which is relatively inexpensive to construct.

The objects of this invention are accomplished, briefly, in the following manner: The card to be read carries information in the form of holes punched at selected ones of a large number of locations arranged in a pattern on the card. The card reader provides a slot for accommodating the card. The reader also mounts a large number of pins, one for each of the card locations, which register with the card locations when the card is in position in the reader, and which pins are adapted to serve as switch actuating members for a corresponding large number of switches mounted in the reader; each pin can serve as an actuating member for a separate, respective switch. All of the switches are normally closed. After the card is inserted into the reader slot, it is moved longitudinally with respect to the pins; if there is a hole in the card at some location, the pin at that location is not moved, but if there is no hole, the pin is moved longitudinally by the card surface to actuate the corresponding switch to an open position. Thus, the switches corresponding to the holes remain closed. The reader also mounts a master switch, and an actuating element therefor, the latter being so arranged that the master switch will be actuated (closed) only when there is a card in proper reading position in the reader.

A detailed description of the invention follows, taken in conjunction with the accompanying drawings, wherein.

Figure 1:
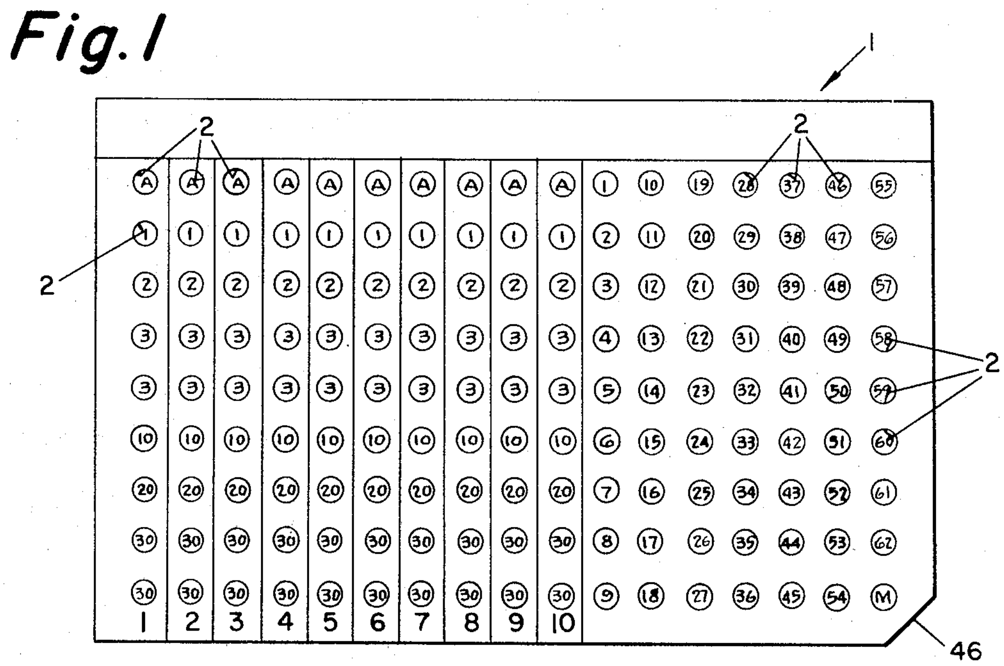
FIG. 1 is a face view of a card adapted to be read by the reader of this invention.

Refer first to FIG. 1, which is a face view of a card such as might be read by the card reader of this invention. The card 1 is made of a suitably strong and lightweight sheet material, such as the synthetic resin known as "Mylar." Alternatively, the card may be made of various other sheet materials, such as cardboard, polypropylene, polyvinyl chloride, etc. The card may be, for example, on the order of 6¼" in width and 4" in height. The card is printed with a multiplicity of circles 2 (as shown, there are 153 of these circles), arranged in a pattern of rows and columns. These circles provide locations which may be selectively punched out to establish the information carried by the card. These circles are punched out wherever it is desired that a contact be made (i.e., wherever it is desired that a switch be closed).

By way of example, the card 1 may be used in a digital proportioning system of the type described in my aforementioned copending application. In such a system, a common pulse generator supplies pulses to two or more valve operators each of which latter is utilized to control the flow of a respective component of the ultimate "blend." The supply of pulses from the pulse generator to the individual valve operators is by way of respective switching devices each of which can be set to pass to its respective valve operator, during a unit time interval, a preselected or predetermined number of the total pulses produced by the pulse generator during this same time interval. The card 1 of this invention may be used to control the aforementioned switching devices in the desired manner. Thus, on the card 1, the vertical columns numbered 1 through 10 may each represent a corresponding one of the components of a "blend." In each column, the circles numbered, 1, 2, 3, 3, 10, 20, 30, and 30 represent corresponding numbers of pulses to be passed from the pulse generator to the appropriate valve operator. By selective punching (aperturing) of these eight locations or circles in any column, it may be seen that any number of pulses, from one through ninety-nine, may be "punched" or "selected," for any one of the ten component columns. As will be explained further hereinafter, the punching out or aperturing of any circle results in a closure of the corresponding switch in the card reader, thereby to pass that number of pulses to the valve operator.

There is also a circle denoted by A, in each of the columns 1 through 10. This location A, in an appropriate column, may be punched to close a switch, thereby to switch the pulses from the pulse generator (traveling toward the valve operator) through an automatic percentage control unit of the type disclosed in my copending application, Serial No. 194,517, filed May 14, 1962, now Patent No. 3,249,115, dated May 3, 1966. Such an APC unit is operable automatically by a motor to vary the number of pulses passed to the valve operator, in response to changes (in some characteristic) detected in the blend.

Toward the right-hand side of card 1, there are seven unnumbered vertical columns of circles, the locations or circles in these columns being designated by the numbers 1 through 62, plus the letter M. These locations may be selectively punched out or apertured to close corresponding switches, for various purposes. For example, these switches may be selectively closed to operate supply valves for feeding the proper, selected material into the "component" pipes for blending, or they may be selectively closed to operate valves for directing the output of the proportioning system into the desired storage or transportation unit.

Summarizing the foregoing, the card 1 of FIG. 1 is selectively punched out or apertured at selected ones of the locations or circles 2, to "put in" the information carried by the card, "punch outs" being made wherever it is desired that a switch be closed.

Figure 2:
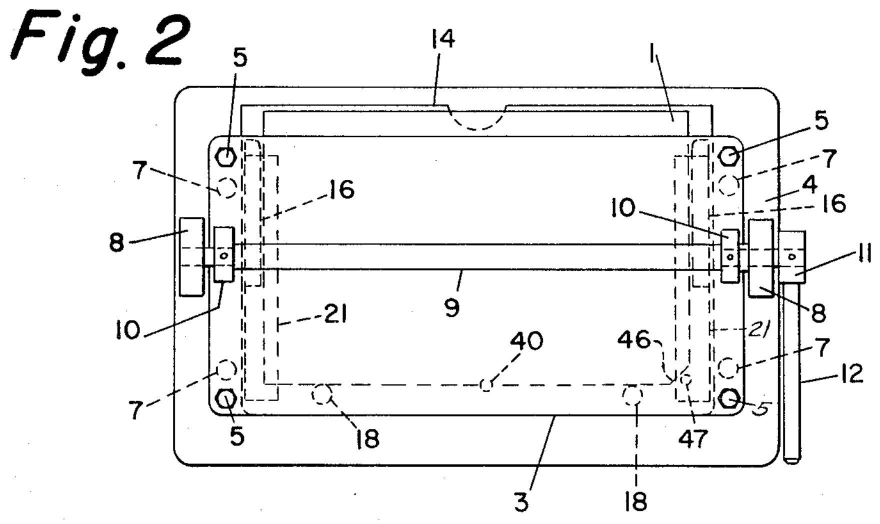
FIG. 2 is a front view of the reader, the device being shown in an operated position.
Figure 4:
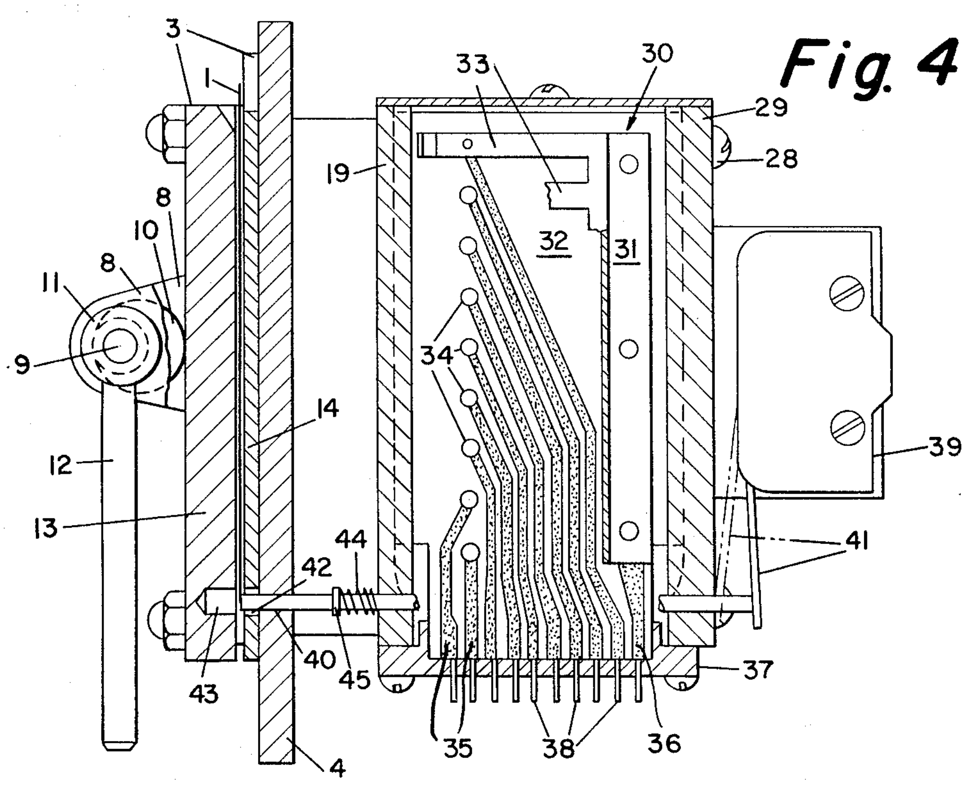
FIG. 4 is a side view of the reader, with certain parts peeled off or broken away to show internal construction.
Figure 3:
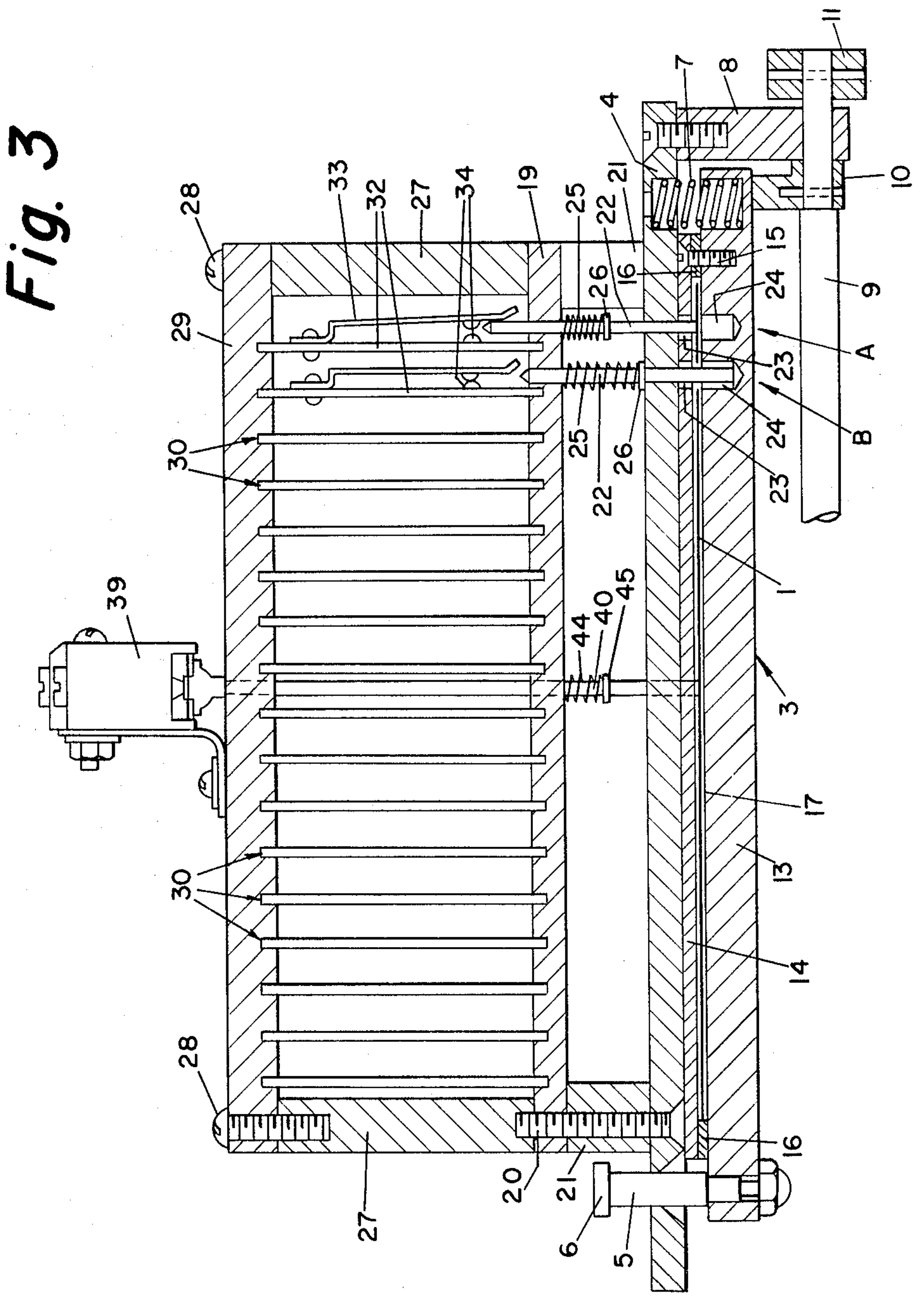
FIG. 3 is a horizontal section through the reader, taken along various horizontal planes to show the operating elements.

Refer now to FIGS. 2–4, which illustrate the card reader of this invention in the "reading" or "operated"

position, with the card 1 in reading position in the reader. A platen assembly 3 is mounted for a limited movement toward and away from a front support plate 4, by means of four guide pins 5 (one at each of the four corners of the platen assembly) which are threadedly secured to the platen assembly 3 and which extend slidably through respective matching apertures provided in plate 4. The platen assembly 3 and the support plate 4 are plate-like (that is to say, their thicknesses are small compared to their other two dimensions), are parallel to each other, and are substantially rectangular in configuration, as shown in FIG. 2. Of course, the movement of platen assembly 3 toward plate 4 is limited by the rear face of the platen assembly coming into engagement with the front face of plate 4. This is the platen assembly position illustrated in FIGS 2–4, and it may be termed the operated, in, or closed position. The movement of platen assembly 3 away from plate 4 is limited by means of heads 6 provided at the inner ends of each of the pins 5 (see FIG. 3). Heads 6 come into engagement with the rear face of plate 4 to limit the outward or forward movement of platen assembly 3. Platen assembly 3 is resiliently biased outwardly, away from plate 4, by means of four compression springs 7 (one at each of the four corners of the platen assembly) whose opposite ends bear respectively against the assembly 3 and the plate 4.

A pair of outwardly (forwardly) extending aligned bearing trunnions 8 are mounted on the front face of plate 4, one at each side of plate 4, beyond the adjacent edges of platen assembly 3. A shaft 9 is rotatably mounted in these trunnions. A pair of cams 10 are pinned to shaft 9, one near each end of this shaft. Cams 10 are located so as to bear against the outer face of platen assembly 3, one cam at each of the sides of this assembly. Cams 10 are constructed and arranged so that when shaft 9 is rotated in one direction (counterclockwise in FIG. 4), the cams will force platen assembly 3 toward plate 4 (against the force of springs 7) into the position illustrated in FIGS. 2–4; when shaft 9 is rotated in the opposite direction (clockwise in FIG. 4), cams 10 allow springs 7 to push platen assembly 3 out or away from plate 4. Shaft 9 extends outwardly beyond one trunnion 8 (to wit, the right-hand trunnion in FIG. 2), and a collar 11 is pinned to this end of shaft 9. Collar 11 is formed integrally at one end of an operating handle 12 which extends downwardly when the card reader is in the operated or closed position illustrated. Rotation of handle 12 toward the up position (i.e., in a direction such that its lower or free end moves toward the observer in FIG. 2, or in the clockwise direction in FIG. 4) rotates shaft 9 clockwise in FIG. 4, thereby rotating cams 10 to allow springs 7 to push platen assembly 3 away from plate 4 to the released, out, or open position. Rotation of handle 12 to the down position (in the counterclockwise direction in FIG. 4) rotates shaft 9 counterclockwise in FIG. 4, thereby rotating cams 10 to force platen assembly 3 toward plate 4, into the operated position illustrated.

The platen assembly 3 comprises two separate plates 13 and 14 which are fastened together by means of screws 15 (see FIG. 3), spacers 16 being interposed between these two plates near the two ends thereof to form a slot 17 between the two plates. Slot 17 is dimensioned to receive therein a card 1 which is to be read. Card 1 is illustrated in reading position within slot 17.

Near the lower or bottom side of the platen assembly 3, a pair of stop pins 18 are positioned within slot 17, one pin being located near each respective end of the slot. When card 1 is inserted into slot 17, its lower edge comes into contact with stops 18, thus limiting the downward movement of the card and providing in effect a "bottom" for the slot.

An intermediate support plate 19, rectangular in outer configuration, is mounted in spaced relation behind plate 4 and parallel thereto, by means of screws 20 which pass through two oppositely-disposed side spacers 21. A multiplicity of pins 22, equal in number to the number of punchable locations or circles on card 1 (this would be 153 pins, in the example given), and distributed or spaced in exact agreement with the spacing and distribution of the circles 2 on card 1, are mounted in plates 4 and 19 so as to extend parallel to the thickness dimension of these plates. The pins 22 are made of an insulating material. The outer or front ends of the pins 22 slidably pass through holes provided in the front support plate 4, there being a separate hole in plate 4 in alignment with each respective pin. A set of holes 23 is also provided through the rear plate 14 of platen assembly 3, there being a separate hole 23 in plate 14 in alignment with each respective one of the pins 22. Holes 23 have a diameter such that pins 22 can pass freely therethrough. A set of clearance holes 24 is provided in the rear face of front plate 13 of assembly 3, there being a separate clearance hole in alignment with each respective one of the pins 22. The clearance holes 24 extend, from the rear face of plate 12, only partially through the thickness of this plate. The clearance holes 24 can receive therein the front ends of the respective pins 22.

The inner or rear ends of the pins 22 slidably pass through holes provided in the intermediate support plate 19, there being a separate hole in plate 19 in alignment with each respective pin.

A separate compression spring 25 surrounds each respective pin 22, and each spring urges its corresponding pin outwardly, i.e., toward the expanded position of the spring. One end of each spring 25 bears against the outer or front face of plate 19, and the other end of each spring bears against an integral collar 26 formed on its respective pin, about midway of the length thereof. Normally, each spring urges its respective pin outwardly to a position wherein collar 26 comes into contact with the inner or rear face of plate 4. The inner ends of the pins 22 are pointed, i.e., conical.

As previously stated, in FIGS. 2–4 the card reader of the invention is illustrated in the operated or in position. To insert a card 1, handle 12 is rotated to the up position. This rotates shaft 9 and cams 10, allowing springs 7 to push out platen assembly 3. In the drawings, a number of pins 22 are illustrated as passing through the slot 17, but in the out position of the platen assembly 3 (wherein pin heads 6 are in engagement with the rear face of plate 4), the slot 17 is in front of the front or outer ends of the pins 22, so that this slot is then free or open. The card 1 is dropped into the slot 17 so that the lower edge of the card contacts the stops 18. In this position, all of the pins 22 are in the extended position, wherein their collars 26 contact the rear face of plate 4.

To operate the card reader, the handle 12 is moved to the down position illustrated. This rotates the shaft 9 and cams 10 counterclockwise in FIG. 4, forcing the platen assembly 3 with the card 1 toward plate 4, into the position illustrated. As previously described, the position of each circle 2 on card 1 corresponds to the position of a pin 22; these circles are punched out wherever it is desired that an electrical contact be made (i.e., wherever it is desired that a switch be closed). As card 1 moves to the rear (toward plate 4), the unperforated portions of the card (such portions as are characterized by the absence of a hole) engage the outer ends of the corresponding pins 22 and force them inward or toward the rear (against their springs 25), as shown at location A. This forces these pins 22 to move rearwardly with respect to plate 19. The pins corresponding to the perforated portions of the card, however (such portions as are characterized by the presence of a hole), as shown at location B, are held out (or to the front) by their springs 25, and are allowed by the holes in the card and clearance holes 24 in plate 13 to remain out. That is to say, the outer ends of these latter pins pass through the slot 17, through the holes in the card, and into the clearance holes 24, as the platen assembly moves toward plate 4; this leaves these latter pins in the extended position, wherein their collars 26 contact plate 4. Therefore, the latter pins do not move with respect to plate 19.

Beyond or to the rear of plate 19, screws 20 thread into side spacers 27, into which latter other screws 28 thread from the rear, to mount a rear support plate 29 in spaced relation behind plate 19 and parallel thereto. Plate 29 is rectangular in outer configuration. The rear face of plate 19 is provided with a plurality of parallel, vertically-extending slots equal in number to the number of vertical columns on card 1. In the example given, this is seventeen. The front face of plate 29 has a plurality of similar slots, each of the slots in plate 19 being aligned with a respective one of the slots in plate 29.

Figure 5:
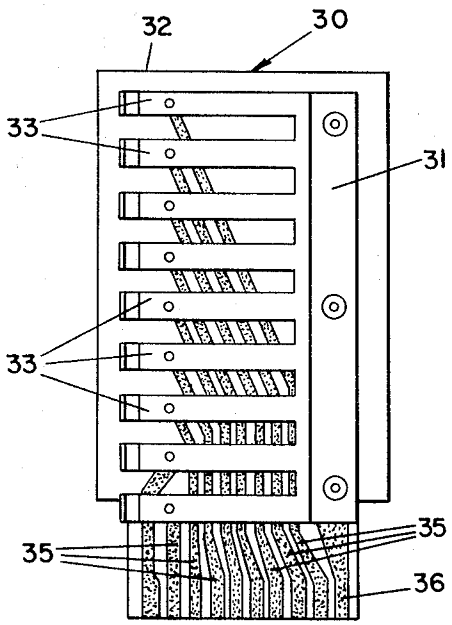
FIG. 5 is an elevation looking at the face of a circuit board assembly.

A printed circuit board assembly 30 is mounted in each pair of aligned slots, so that a total of seventeen circuit board assemblies are mounted in the space between plates 19 and 29. The boards of assemblies 30 are all parallel to each other, as indicated in FIG. 3. Refer now to FIG. 5, which is a face view of one of the circuit board assemblies 30; all seventeen of them are exactly alike. The assembly 30 includes a metallic contact strip 31 fastened to an insulating board 32 and cut at its front end into a number of separate vertically-spaced resilient fingers 33 equal in number to the number of locations or circles in each vertical column of card 1; in the example given, there would be nine such fingers. The fingers 33 are so spaced that, when the assembly 30 is in position in the card reader, adjacent fingers 33 are respectively aligned with adjacent ones of the pins 22 which are mounted in a single vertical column. That is to say, when all of the assemblies 30 are in position in the card reader, each one of the multiplicity of fingers 33 is aligned with a respective one of the pins 22. See FIG. 4.

On the board 32, there are nine vertically-spaced and vertically-aligned contacts 34 which are mounted on the board so that they make continuous electrical contact with respective ones of the nine conducting lines 35 on this board. The main body of contact strip 31 (to which fingers 33 are, of course, all electrically connected) makes continuous electrical contact with a conducting line 36 on board 32; this provides a common output circuit for the assembly. The conducting line 36 and all nine of the conducting lines 35 extend separately down to the bottom of board 32 and plug into a ten-contact receptacle 37 (see FIG. 4). Receptacle 37 has ten electrical contacts 38, to which wires can be connected to carry away the information as to whether or not the individual contacts are closed.

The nine fingers 33 are aligned respectively with the nine contacts 34, so that each finger can make electrical contact with a respective one of the contacts 34. In fact, it may be stated that each finger-contact set constitutes a separate electrical switch, so that there are nine switches per assembly 30, or a total of 153 switches for the seventeen assemblies of the complete reader. It will be appreciated that each such switch is positioned in registry or alignment with a respective one of the switch actuating members or pins 22, and in registry or location with a respective one of the card circles or locations 2 when the card 1 is in reading position in the reader.

The nine conducting lines 35 with their respective contacts 34 form nine separate input circuits, and by means of the nine switches previously described (each switch including a respective finger 33), any one or any combination of these input circuits may be connected to the common output circuit including strip 31 and conducting line 36. Thus, for example, if the numbers of pulses indicated by the legends in the circles of the columns numbered 1 through 10 of card 1 (see FIG. 1) are supplied from an external source to respective ones of the conducting lines 35, then by appropriate selection of the switches to be closed any preselected number of pulses, from one through ninety-nine, may be transferred to output line 36.

Normally, the spring force in each finger 33 is such that it will be touching its respective contact 34. Thus, if no movement of finger 33 occurs as the card reader is operated, the switch of which this finger forms a part remains closed.

As previously stated, the circles 2 of card 1 are punched out or perforated (that is, a hole is punched at the circles) wherever it is desired that a switch contact be made. As handle 12 of the card reader is moved to the down position, thereby to force the platen assembly 3 with the card 1 in or to the rear (toward plate 4), the unperforated portions of the card engage the outer ends of the corresponding pins 22 and force them inward, as shown at location A (FIG. 3). The pointed inner ends of these pins engage the tabs (outer ends) of the corresponding fingers 33, lifting such fingers off their contacts 34. This means that the switches at these locations (i.e., the locations characterized by the absence of a hole) are opened. Since the pins 22 are made of insulating material, no grounding of the fingers occurs when they are engaged by the pins.

However, the perforated portions of the card (such portions as are characterized by the presence of a hole) allow the corresponding pins 22 to pass through the card and into the corresponding clearance holes 24. That is to say, these pins are held out (or to the front) by their respective springs 25, and are allowed to remain out as card 1 moves to its in or operated position. The contact fingers 33 corresponding to these last-mentioned pins 22 are thus not moved, but are permitted to remain closed on their respective contacts 34. This means that the switches at the hole locations are closed; a switch closure is made for each hole in the card 1.

A master switch 39, which may take the form of a microswitch mounted on the rear face of rear plate 29, is so connected into the circuit of the card reader that nothing can operate until it is closed. As will be described, switch 39 is open: (1) when the reader is open or unoperated; (2) when the card is not seated all the way; (3) when there is no card in the reader; and (4) when the card has been inserted backwards or upside down. Thus, the switch 39 provides a "checking" or "foolproofing" arrangement.

The switch 39 is operated by a special pin 40, which is somewhat similar to pins 22 previously described, except that pin 40 is considerably longer and extends entirely through the space between plate 19 and plate 29 and projects to the rear of plate 29. The rear of inner end of pin 40 contacts the operating leaf 41 of switch 39. In FIG. 4, the dotted-line position of leaf 41 corresponds to the unoperated or open position of switch 39, while the solid-line position of leaf 41 corresponds to the operated or closed position of this switch.

Pin 40 is mounted in plates 4, 19, and 29 in such a position as to contact the lower edge of card 1 only if the card is properly seated (see FIG. 2). Pin 40 extends parallel to the thickness dimension of plates 4, 19, and 29.

The outer or front end of pin 40 slidably passes through a hole provided in front plate 4. A hole 42 is provided through the rear plate 14 of platen assembly 3, in alignment with pin 40. Hole 42 has a diameter such that pin 40 can pass freely therethrough. A clearance hole 43 is provided in the rear face of front plate 13 of assembly 3, hole 43 being similar to the clearance holes 24 previously described and being aligned with pin 40. The inner or rear end of pin 40 slidably passes through aligned holes provided in plates 19 and 29. A compression spring 44 surrounds pin 40, and urges this pin outwardly. One end of spring 44 bears against the outer or front face of plate 19, and the other end of this spring bears against a collar 45 integrally formed on pin 40.

The card 1 has a corner 46 cut off, say at an angle of 45° (see FIGS. 1 and 2). A pin 47 is positioned within slot 17, in such a position that if the card 1 is improperly inserted in the slot, the interfering corner of the card prevents the card from moving down to a completely seated position in the slot, but if the card 1 is properly inserted, the cut-off corner 46 prevents any interference between pin 47 and the card, and thus the card is able to move down to a completely seated position, wherein its lower edge contacts stop pins 18. Unless the card is in this completely seated position, its lower edge will not contact pin 40 when the platen assembly (and card) move to the operated position.

As previously stated, pin 40 contacts or engages the lower edge of the card 1 only if there is a card in the reader and only if it is properly seated. Of course, if the card is inserted in the slot backwards or upside down, the pin 47 prevents proper seating of the card. If proper engagement between the lower edge of the card and pin 40 is effected, the action produced will be analogous to that indicated at location A, previously described. In this case, as card 1 moves to the rear in response to movement of handle 12 down, the lower edge of card 1 engages the outer end of pin 40 and forces it toward the rear against its spring 44, moving switch operating leaf 41 to the solid-line position and closing switch 39.

In the open position of the card reader, wherein platen assembly 3 is moved away from plate 4, the pin 40 is in an extended position, wherein its collar 45 is in contact with the inner face of plate 4; it is urged to this position by spring 44. With pin 40 in this position, switch operating leaf 41 is in the dotted-line position of FIG. 4, and switch 39 is open.

When there is no card in the reader, or when the card is not seated properly for any reason (such as when it is inserted backwards or upside down), there will be no engagement between the card and pin 40, and the action will be analogous to that indicated at location B, previously described. In this case, as the platen assembly 3 moves to the rear in response to movement of handle 12 down, the outer end of pin 40 passes through slot 17 and into the clearance hole 43. This leaves pin 40 in the extended position, wherein switch leaf 41 is in the dotted-line position and switch 39 is open. It should be apparent that pin 40 is in this case maintained in the extended position by its spring 44.

From the foregoing, it will be seen that a relatively inexpensive card reader has been provided. Electrical contacts are made (i.e., switches are closed) as called for by holes punched in a card. Also, the printed circuit board construction (the construction of assembly 30) allows quick and easy replacement of any defective contacts (switches); all that is necessary is to slide a defective assembly out, and slide a new one into its place.

The invention claimed is:

1. For reading a punched card containing information in the form of holes punched at selected ones of a multiplicity of locations arranged in a pattern on said card, a card reader comprising a card chamber for receiving a card to be read, means for moving said chamber from a card-receiving to a card-reading position, a plurality of separate printed circuit boards on each one of which are mounted a plurality of switches, providing a multiplicity of switches one for each of said locations, said circuit boards being slidably mounted in said reader and being readily removable therefrom; and a multiplicity of switch actuating members equal in number to the switches, said members being positioned at locations registering respectively with the said card locations when a card in said chamber has been moved to card-reading position, said members being aligned with the respective switches and being brought, upon movement of said chamber to card-reading position, to one or the other of two positions depending on the presence or absence of a hole in the card at the corresponding location, thereby to control each switch in accordance with the position of its corresponding member.

2. A card reader as recited in claim 1, including also an additional master switch, and an actuating element for said additional switch so arranged that said additional switch will be actuated, upon movement of said chamber to card-reading position, only in response to the presence of a card in proper position in said chamber.

References Cited by the Examiner

UNITED STATES PATENTS

| | | | |
|---|---|---|---|
| 2,761,624 | 9/1956 | Marples et al. | 235—61.11 |
| 3,001,699 | 9/1961 | Arthur | 235—61.11 |
| 3,139,519 | 6/1964 | Reinschmidt | 235—61.11 |

MAYNARD R. WILBUR, *Primary Examiner.*

DARYL W. COOK, *Examiner.*